B. C. RYDBERG.
AUTOMOBILE SHOE BRUSH.
APPLICATION FILED APR. 12, 1919.
1,333,634.
Patented Mar. 16, 1920.
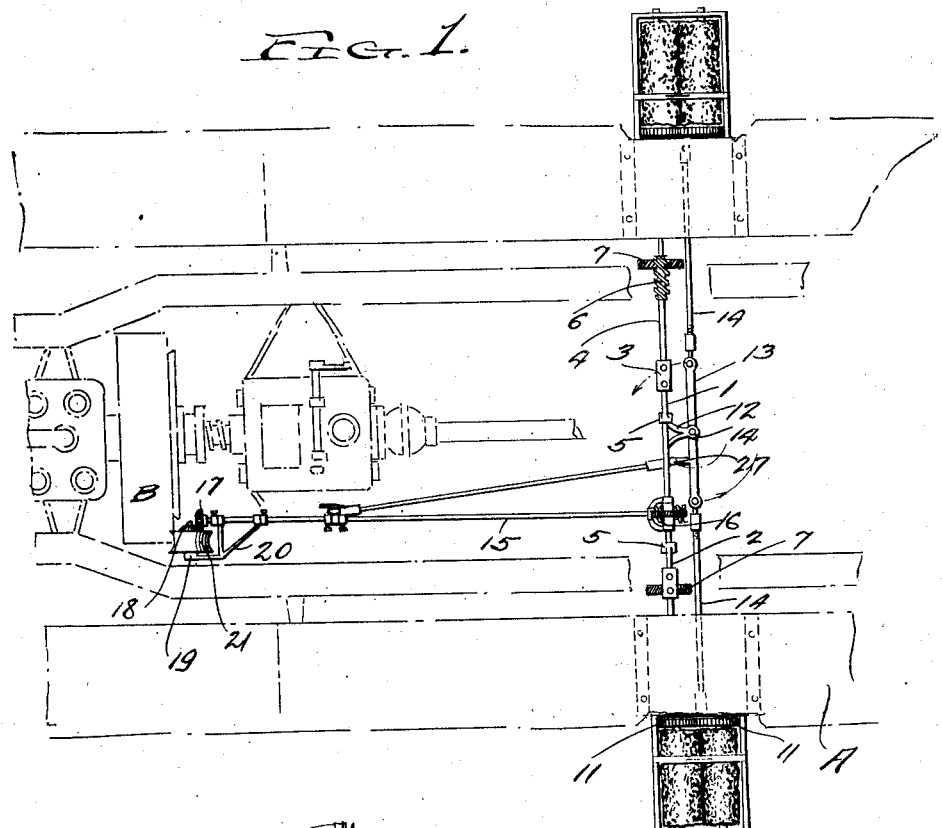
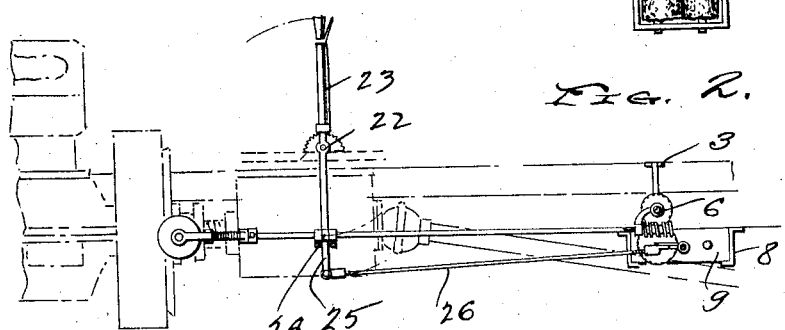

UNITED STATES PATENT OFFICE.

BERNHARD C. RYDBERG, OF RED LODGE, MONTANA.

AUTOMOBILE SHOE-BRUSH.

1,333,634.  Specification of Letters Patent.  Patented Mar. 16, 1920.

Application filed April 12, 1919. Serial No. 289,494.

*To all whom it may concern:*

Be it known that I, BERNHARD C. RYDBERG, a citizen of the United States, residing at Red Lodge, in the county of Carbon and State of Montana, have invented certain new and useful Improvements in Automobile Shoe-Brushes, of which the following is a specification.

This invention relates to automobile equipments and more particularly to a brush attachment designed to be mounted upon the automobile near the running boards thereof whereby a person stepping into the automobile may engage his shoes with the brushes so that dirt will be brushed from his shoes before he steps into the automobile.

The primary object of the invention is to provide movable brushes which may be disposed in position for cleaning the shoes when a person is entering the automobile and which may be withdrawn to inoperative position when the brushes are not in use.

The invention further aims to provide revoluble shoe brushes connected with an apparatus arranged to be operated by the automobile engine so that the brushes may be revolved when in use for effectively cleaning the shoes of the person using the device.

Another object of the invention is to provide an apparatus of this character which may be drawn into and out of operative position from a point near the seat occupied by the operator of the vehicle.

A further object of the invention is the production of a device of this character which consists of comparatively few parts and is simple in construction but durable and well adapted to withstand the rough usage to which devices of this character are ordinarily subjected.

For a full description of the invention and the advantages and merits thereof, reference is to be had to the following description and accompanying drawings, in which:—

Figure 1 is a plan view of the apparatus mounted upon an automobile chassis, the latter being shown by broken lines.

Fig. 2 is a side elevation of the same,

Fig. 3 is a perspective view of one of the brush elements and the adjacent operating parts.

Referring to the drawings, wherein is illustrated the preferred form of my invention, in which like numerals of reference indicate like or corresponding parts throughout the several views, the brackets 1 and 2 are provided with the flanges 3 which may be secured to the floor of the automobile beneath the same to extend downwardly for supporting a shaft 4 which is journaled in the bearings 5 carried by the brackets. Each end of the shaft 4 carries a worm 6 adapted to mesh with a worm gear 7 one of which is provided for each of the brushing devices as shown to advantage in Fig. 3.

Each running board A of the automobile is provided with depending brackets 8 adapted to slidably receive a brush housing 9 which is of substantially rectangular formation and has a pair of revolving brushes 10 mounted therein the ends of the brushes being journaled in the end walls of the housing 9. The shaft of one brush is projected inwardly beneath the running board and receives one of the gears 7 which meshes with the adjacent worm 6. The shafts of the brushes are simultaneously driven by the intermeshing gears 11.

One of the brackets 1 is provided with a supporting arm 12 which pivotally supports a lever 13 pivoted as at 14 intermediate its ends. Normally this lever 13 is parallel with the shaft 4 as shown to advantage in Fig. 1. This is the position which the lever assumes when the brushes are in operative position. Each housing 9 is connected by a link 14 to one of the adjacent ends of the lever 13 so that when the lever is swung on its pivot 14 the housing will be moved on supporting slides 8.

A longitudinally extending drive shaft 15 has one end provided with a worm 16 which meshes with a worm gear on the shaft 4 so that the shaft 4 may be driven when the shaft 15 is actuated. The latter has its opposite end provided with a beveled gear 17 in mesh with a beveled pinion 18 on one end of a stub shaft 19 carried by a bracket 20. The stub shaft 19 is also provided with a drive wheel 21 having its surface covered with a suitable covering such as leather or the like. This wheel is disposed in a position to conveniently engage one edge of the fly wheel B whereby motion may be imparted to the mechanism when the fly wheel is in motion.

Pivotally mounted on the floor of the automobile is an operating lever 23 one end of which extends downwardly and is connected to the shaft 15 as indicated at 24. This end of the lever is also projected beyond the connection 24 and the extended end 25 thus provided is connected to one end of an operating rod 26 which has its rearward end joined to the finger 27 carried by the arm or lever 13.

As shown in Fig. 1 the mechanism is in the position it will assume when the device is in use, the brush casing being extended outwardly beyond the runing board of the automobile so that the person entering the automobile may engage his shoe with the brushes for cleaning the shoe before entering the automobile. The wheel 21 of course, is in contact with the fly wheel B and the engine is in motion. As soon as the brushes are no longer required, the person sitting in the operator's seat may pull the lever 23 which will swing on its pivot 22 and thereby exert a pull on the operating rod 26 which will pull on the lever 13 and swing the latter on its pivot 14 thereby drawing the links 14 inwardly and pulling the brush casing in under the running board A, the casing being slidably supported by the brackets 8. The brushes, therefore will be drawn into inoperative position where they will be also invisible.

At the same time, the worm gears 7 will be drawn inwardly and out of engagement with the worms 6 on the shaft 4 and the same movement of the lever 23 will longitudinally move the shaft 15 for disengaging the worm 16 with the adjacent worm gear on the shaft 4. The wheel 21 will also be moved out of engagement with the fly wheel thereby disposing all of the parts in inoperative position. When the vehicle stops to receive another passenger, the operator will throw the lever rearwardly so that the reverse of the above described operation will occur and the brushes will be disposed in position where the person may engage his shoes therewith for cleaning them before entering the automobile.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:

1. An apparatus of the character described comprising slidably mounted brushes, a shaft, gearing mechanism connected to the brushes and to the shaft for rotating the brushes when the shaft is actuated, means for actuating the said shaft, and means for simultaneously moving the said shaft for disengaging said gearing mechanism and slidably moving the said brushes to either operative or inoperative positions.

2. An apparatus of the character described comprising slidably mounted brushes, a drive shaft, a brush operated shaft, having gearing mounted thereon, the said brushes being provided with gearing connected with the said gearing of the brush operating shaft to actuate the brushes when the drive shaft is actuated, and means to slide the said drive shaft for disengaging the said gearing and move the said brushes to inoperative position.

3. An apparatus of the character described comprising slidably mounted brushes, a drive shaft, means for slidably moving the said brushes simultaneously to operative or inoperative positions, a rod connecting the said drive shaft with the said means to actuate the latter when the said drive shaft is reciprocated, means to reciprocate the said drive shaft, and gearing mechanism connecting the drive shaft with the said brushes to actuate the brushes when the said drive shaft is in operative position.

4. An apparatus of the character described, comprising slidably mounted revolving brushes disposed on opposite sides of an automobile, a driving apparatus adapted for engagement with the engine of an automobile, gearing mechanism connected with the driving apparatus and with the said brushes to operate to revolve the brushes when the said driving apparatus is in motion, and means to simultaneously disengage the driving apparatus from actuation by the said engine and move the said brushes to inoperative position.

In testimony whereof I affix my signature in presence of two witnesses.

BERNHARD C. RYDBERG.

Witnesses:
A. NEWBERG,
R. G. WIGGENHORN.